United States Patent [19]
Spurlock

[11] Patent Number: 5,581,766
[45] Date of Patent: Dec. 3, 1996

[54] SELECTABLE VIDEO DRIVER SYSTEM

[75] Inventor: Randolph W. Spurlock, Tomball, Tex.

[73] Assignee: Compaq Computer Corporation, Houston, Tex.

[21] Appl. No.: 329,769

[22] Filed: Oct. 27, 1994

Related U.S. Application Data

[63] Continuation of Ser. No. 62,186, May 17, 1993, abandoned.

[51] Int. Cl.⁶ ........................................................ G06F 9/00
[52] U.S. Cl. ............................ 395/652; 395/500; 395/681
[58] Field of Search ........................................ 395/700, 500

[56] References Cited

U.S. PATENT DOCUMENTS

| | | | |
|---|---|---|---|
| 4,803,623 | 2/1989 | Klashka et al. | 395/275 |
| 5,136,713 | 8/1992 | Bealkowski et al. | 395/700 |
| 5,307,491 | 4/1994 | Feriozi et al. | 395/700 |
| 5,313,592 | 5/1994 | Buondonno et al. | |

FOREIGN PATENT DOCUMENTS

| | | |
|---|---|---|
| 4102952 | 4/1992 | Japan . |
| 4233649 | 8/1992 | Japan . |
| 4235655 | 8/1992 | Japan . |

*Primary Examiner*—Krisna Lim
*Attorney, Agent, or Firm*—Vinson & Elkins L.L.P.

[57] ABSTRACT

A method and apparatus relating to video systems are disclosed. The method automatically selects an appropriate video system driver based on the current video system configuration. In one embodiment, an intermediate video driver is loaded and perceived by the operating environment as the sole video driver. The intermediate video driver receives commands issued to the system video driver and communicates those commands to the selected appropriate configuration-specific video driver.

18 Claims, 5 Drawing Sheets

SELECTABLE VIDEO DRIVER SYSTEM

RELATED APPLICATIONS

This application is a Continuation of application Ser. No. 08/062,186 filed May 17, 1993, and entitled "SELECTABLE VIDEO DRIVER SYSTEM," now abandoned.

TECHNICAL FIELD

This invention relates to video systems, and more particularly to a method for automatically selecting an appropriate video system driver based on the current video system configuration.

BACKGROUND OF THE INVENTION

As the development of computer systems continues, a corresponding burden is placed on supporting software. As one key example, as hardware becomes more sophisticated, so does the need for refined and/or additional hardware drivers. A driver is a computer program which allows a specific piece of hardware to communicate with an operating system or environment. This example is demonstrated in the computer environment currently created by MICROSOFT WINDOWS. Typically, when operating under WINDOWS, a new device driver must be installed when an operator adds a new device to the underlying computer system.

The present invention arises in connection with driver compatibility and advancements in video subsystems. Particularly, a change in a video configuration (e.g., video controller) often requires, or benefits from, a corresponding change in the video driver. For example, one relatively recent computer development is the creation of so-called docking bays. A docking bay is a hardware setup where a desktop chassis has a bay which accepts a laptop computer. The desktop chassis then uses the processor of the laptop for processing and to operate peripherals typically associated with the desktop computer. Thus, when the laptop is removed from the docking bay, its video driver must support the laptop video configuration which typically includes a flat panel display (such as an LCD screen). Conversely, when the laptop is inserted into the docking bay, the chassis of the desktop bay most likely includes a more versatile video configuration including a CRT monitor. Often the monitor supports higher resolution and/or a greater number of colors than the flat panel display of the laptop. Indeed, most modern laptops have insufficient power and/or space to support the more sophisticated video technology available in larger machines such as desktop computers. Consequently, the monitor of a larger machine often uses a separate and more advanced video controller which, in turn, operates optimally only if the corresponding video driver is selected to drive the advanced controller.

Under currently known systems, an operator is required to manually change the video driver to accommodate the docking bay scenario described above. Thus, before removing the laptop from the docking bay, the operator interacts with the computer to select the video driver necessary to drive the laptop configuration once the laptop is removed from the bay. Typically, this operation is performed using either the WINDOWS Setup or Control Panel function. Later, either before or after inserting the laptop into the docking bay, the user again interacts with the computer and changes the video driver. In this instance, the user selects the driver necessary to drive the configuration of the desktop computer.

Without necessarily limiting the present invention, note that the concepts discussed and claimed below have various advantages in connection with the WINDOWS environment. Accordingly, FIG. 1 illustrates a pictorial view of a subsystem 10 of WINDOWS responsible for, among other things, controlling graphic subsystems such as printers, plotters, monitors, screens and the like. FIG. 1 further illustrates the interaction of a program application 12 with the software components of subsystem 10.

Subsystem 10 includes a graphics device interface (GDI) 14, a window manager 16 and a video driver 18. GDI 14 handles the protocol between application 12 and video driver 18. Note also that GDI 14 handles protocol between application 12 and additional components (not shown) in the WINDOWS system. Window manager 16 generally supervises the overall visual presentation to the user, such as the size, location and visibility of an item (e.g., a window, an icon) as displayed on a graphics device.

Each of the components within subsystem 10 further includes an applications programmer's interface (API), denoted 14a, 16a and 18a, respectively. As known in the art, the API are entry points corresponding to certain minimum functions required to ensure WINDOWS compatibility. Thus, the API are specified so that a programmer may properly draft code to communicate with WINDOWS protocol. Thus, for a given component within subsystem 10, such as GDI 14, a programmer is provided a set of API entry points 14a where each point corresponds to a particular function(s). Accordingly, the programmer may write his or her code to communicate with a given API entry point to accomplish a function(s) corresponding to that point.

Note that any WINDOWS-compatible device driver, such as video driver 18, also includes API entry points 18a through which programmers can effect the functionality of the driver, and its corresponding hardware device. This driver functionality is required to match at least the minimum functionality requirements set forth by WINDOWS.

Video driver 18 further includes a set of resources 18b. Resources 18b typically include items such as bit maps for items like cursors, menu boxes, maximize/minimize boxes, other icons, etc. Resources are based on display size and, hence, differ vastly on a device-to-device basis. The resources are pure data rather than a function which is called. For example, resource bit maps may be identified with a pointer in combination with a draw function which will draw in accordance with the identified bit map. Thus, an icon or other resource may be displayed in this manner.

The typical interaction of application 12 with subsystem 10 is as follows. When WINDOWS is loaded, a kernel (not shown) oversees the loading of the various pieces for baseline operations. The kernel reviews a file typically denoted "SYSTEM.INI" to determine the initial setup for the particular WINDOWS environment. The SYSTEM.INI file includes, among other things, an identification of the video driver previously selected by a user as described above. Thus, the kernel loads the previously identified video driver. Thereafter, the kernel loads GDI 14 and window manager 16.

After video driver 18 is loaded, window manager 16 issues an inquire command. Next, GDI 14 issues an enable command along with a pointer identifying a location within GDI 14. In response, video driver 18 returns infostructure information to the GDI data structure commencing at the address identified by the pointer. Such information concerns the video driver/device, such as which functions are supported, display size, color format, aspect ratio, etc. In addition, both GDI 14 and window manager 16 create tables 14*b* and 16*b*, respectively, which identify the API entry points 18*a* of video driver 18 corresponding to particular functions which may be called by either GDI 14 or window manager 16.

To perform a given video function, application 12 performs a Call to the API of either GDI 14 or window manager 16. Typically, the majority of Calls for video purposes are made to GDI 14. Thus, for example, consider the instance where application 12 calls GDI 14. More particularly, application 12 issues a Call to API 14*a* of GDI 14. In response, GDI 14 issues the appropriate Call or Calls to API 18*a* of video driver 18.

Note that the number of Calls from GDI 14 depends on the particular function as well as the sophistication of the functionality for a given video driver 18. Particularly, certain device drivers may include advanced functions (and corresponding API) above and beyond that required by WINDOWS. Thus, if one of these advanced functions is being requested by application 12, GDI 14 may directly access the corresponding API 18*a* of video driver 18. If the advanced function is not provided by video driver 18, then GDI 14 translates the application request into constituent requests to the video driver. The constituent requests are performed using the minimal set of functions required of the video driver. Accordingly, the functions performed by the constituent requests combine to accomplish the more sophisticated request initially provided by application 12.

In view of the above, it should be appreciated that the WINDOWS environment, as exemplified in combination with the use of docking bays, creates situations involving changes in video drivers. The frequency of driver change is naturally affected by the frequency of insertion/removal of the laptop in/out of the desktop docking bay. Note that the need to re-select and/or reconfigure a driver also may arise due to a change in the video system. Thus, even absent the docking bay example, an operator may change an existing video controller within a computer (e.g., desktop) and, hence, create the need to also change the appropriate video driver. Indeed, as computers further develop, it is believed that other alternative arrangements may evolve also requiring a relatively frequent change in video driver selection. Accordingly, in each of the-above scenarios, as well as those developed in the future, it is an object of the present invention to provide a method for automatically selecting an appropriate video system driver based on the current video system configuration.

It is a further object of the present invention to provide a method for compiling information about the protocol exchanged between the WINDOWS subsystem and a particular video driver.

It is a further object of the present invention to provide a method for providing access to driver resources.

It is a further object of the present invention to provide a method for controlling the kernel flag to prevent an erroneous indication that video driver resources have been preprocessed.

Still other objects and advantages of the present invention will be readily apparent to a person having skill in the art with reference to the following description, figures and claims.

SUMMARY OF THE INVENTION

In one embodiment, the present invention includes a method of driving a video device having a configuration of a predetermined type. The method electronically determines the type of the configuration. Thereafter, the method load a video driver which corresponds to the previously identified configuration type.

Various additional aspects of the method may be included with the present invention. For example, the configuration identification may occur by polling a register on a controller, wherein the register stores data identifying the type of the controller. As another example, the method also preferably involves loading an intermediate video driver. The intermediate video driver receives video function calls, and then communicates those commands to the selected appropriate configuration-specific video driver. Numerous additional aspects are discussed in greater detail below.

BRIEF DESCRIPTION OF THE DRAWINGS

For a more complete understanding of the present invention and its advantages, reference is now made to the following drawings in which.

DETAILED DESCRIPTION OF THE INVENTION

The preferred embodiment of the present invention is understood with reference to FIGS. 1–4*b*, wherein like numerals refer to like and corresponding parts or steps of the present invention.

Figure 1:
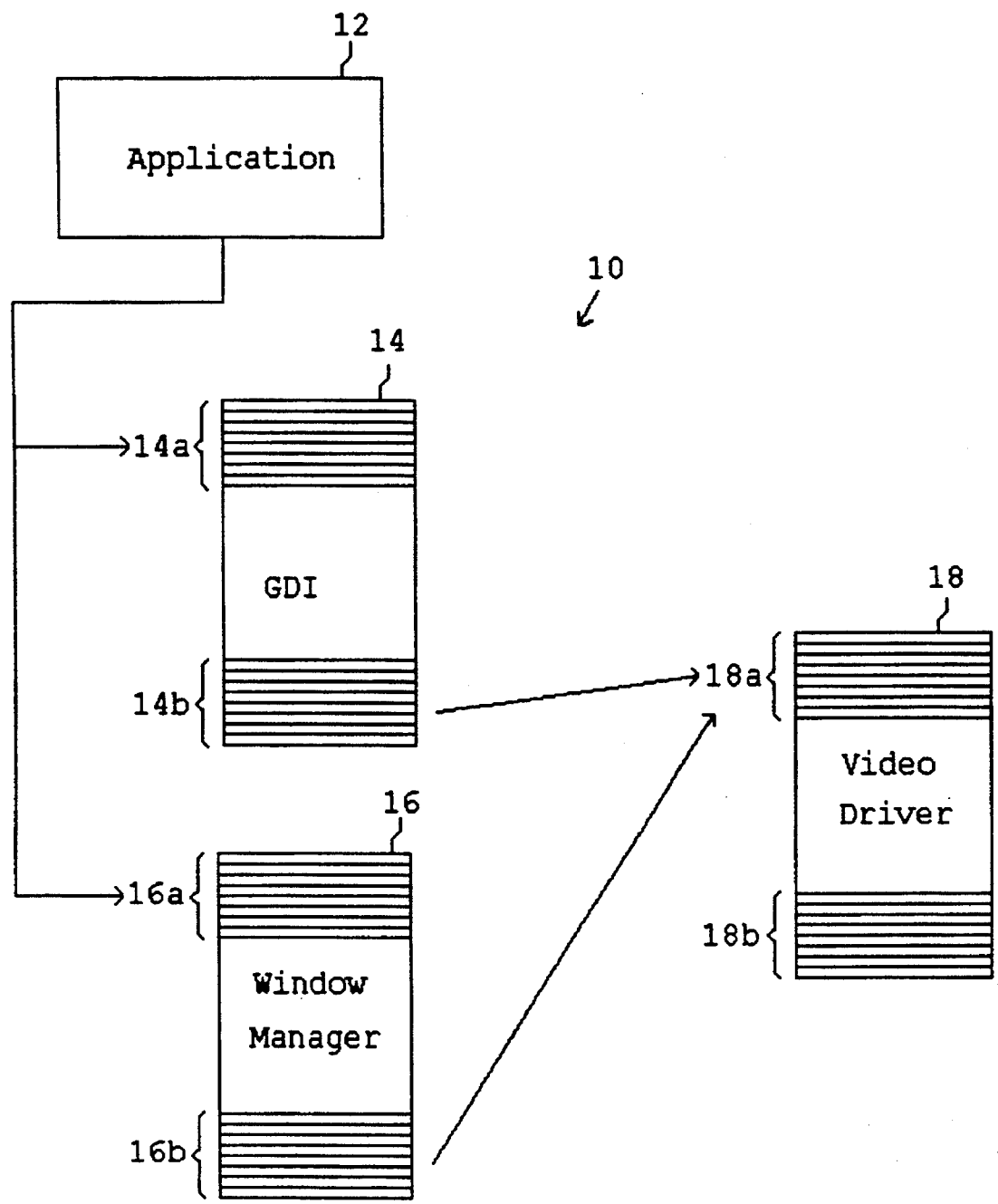
FIG. 1 illustrates a pictorial view of a WINDOWS subsystem and its interaction with an application program.
Figure 2:
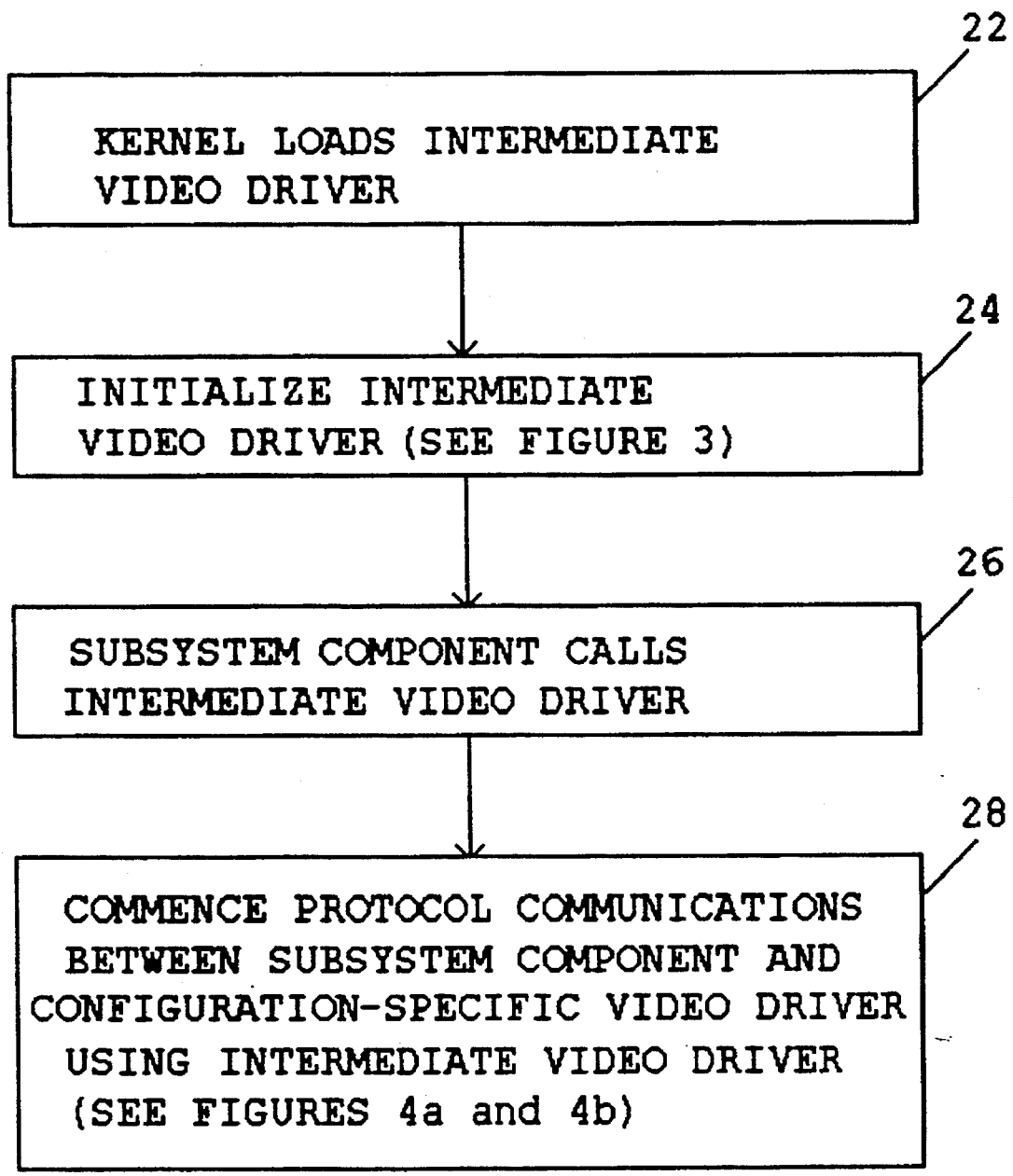
FIG. 2 illustrates a flowchart of the preferred methodology of the present invention.

FIG. 2 illustrates a flowchart of the preferred methodology of the present invention designated generally at 20. As appreciated from the following description, method 20 implements an intermediate video driver to ultimately permit communication between WINDOWS and a video driver which is tailored for the specific video configuration being driven at the time of operation. Thus, in the docking bay example set forth above, method 20 operates to automatically establish protocol communications between WINDOWS and either the laptop controller, or the desktop controller, depending on whether the laptop is inserted in, or removed from, the desktop chassis.

Method 20 commences with step 22 where the WINDOWS kernel loads the intermediate video driver in the same manner as the kernel loads any given video driver in the prior art. Thus, as described above, by referring to the SYSTEM.INI file, the kernel loads the file identified as the video driver which, according to method 20, is the intermediate video driver.

Method 20 continues with step 24 which initializes the intermediate video driver. The specific initialization steps are described in greater detail below with respect to FIG. 3. Note that the initialization automatically selects a video driver which is specific for the video configuration then in use. This "configuration-specific" video driver ultimately communicates, using the assistance of the intermediate video driver, with the WINDOWS system.

In step 26, and after initializing the intermediate video driver and, hence, after selecting the configuration-specific video driver, the window manager and GDI commence direct communications with the intermediate video driver rather than with the configuration-specific video driver. The window manager and GDI initially communicate with the intermediate video driver in the same manner as done in the prior art with respect to the dedicated video driver. Thus, the window manager issues an inquire command, and the GDI issues an enable command along with a pointer, to the intermediate video driver. The intermediate video driver responds by returning its infostructure to the GDI commencing at the location specified by the pointer. Consequently, from the perspective of the WINDOWS system, the intermediate video driver is the sole video driver for the system. As detailed below, however, the infostructure returned to the GDI by the intermediate video driver is actually that of the configuration-specific video driver. Moreover, the resources of the configuration-specific video driver are also available to the WINDOWS system as if part of the intermediate video driver.

Once the GDI has received the intermediate video driver infostructure, protocol communications commence in step 28 and the WINDOWS system perceives the intermediate video driver as the actual video driver. As detailed below in connection with the alternative embodiments of FIGS. 4a and 4b, the intermediate driver operates to communicate the WINDOWS commands to the configuration-specific video driver.

Figure 3:
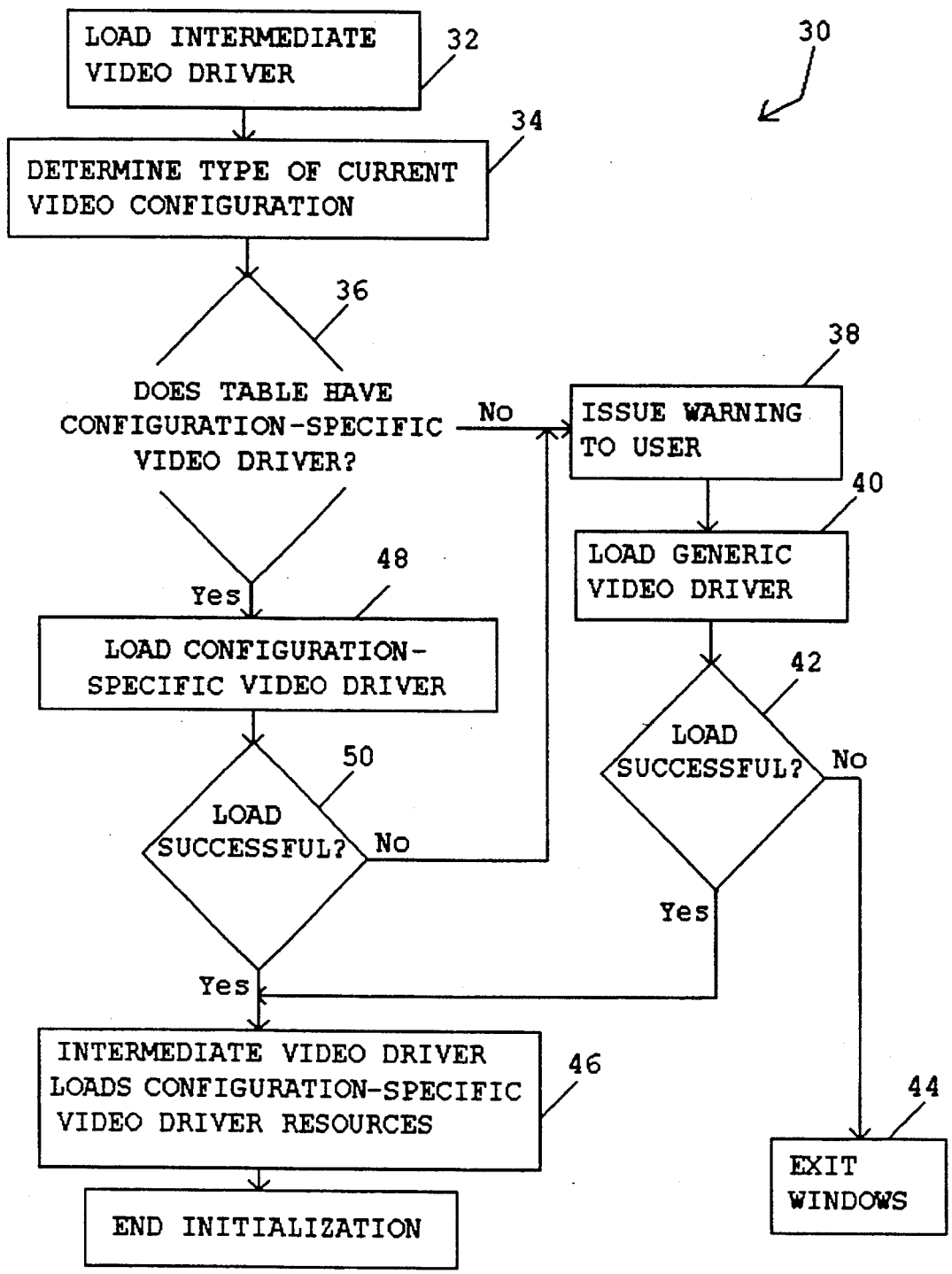
FIG. 3 illustrates a flowchart of the preferred methodology to initialize the intermediate video driver.

FIG. 3 illustrates a method 30 for initializing the intermediate video driver, and commences with a step 32. Step 32 loads the intermediate video driver by the WINDOWS system. In the preferred embodiment, step 32 is accomplished by configuring the WINDOWS system to identify the intermediate video driver as the video driver for the system. This identification may be performed using the Control Panel or Setup features as described above. Thereafter, the intermediate video driver is loaded by the WINDOWS kernel.

In step 34, the intermediate video driver identifies the current type of video configuration which will communicate with the WINDOWS system. For example, in the laptop/docking bay scenario described above, step 34 determines whether the laptop is inserted into the desktop (i.e., providing communication to the desktop video controller), or is removed from the desktop (i.e., providing communication to the laptop video controller). The identification process of step 34 may occur in many ways identifiable by a person having skill in the art. As one example, the Assignee of the subject invention, Compaq Computer Corporation, typically includes an ASIC (i.e., application specific integrated circuit) identification register on each of its video controllers. The ASIC register includes information which is polled by a Call to the register and identifies whether the controller drives a flat screen or a CRT device. Moreover, in many instances, the system ROM and/or the video BIOS may be polled to identify video characteristics corresponding to a particular type of video configuration. Further, other information, such as available video memory, monitor type, pixel depth, etc., may all be considered to identify the current video configuration.

In step 36, the intermediate video controller scans a table which includes a plurality of titles, or other mechanisms of identification, of video drivers. Further, step 36 determines whether the table includes the video driver specific to the configuration identified in step 34. If the table does not include an identification for the appropriate driver, method 30 continues to step 38. In step 38, a warning is issued to the user that the configuration-specific video driver was not identified. This warning preferably presents a message to the computer display indicating that identification failure.

Since the correct driver could not be identified, method 30 attempts to load a generic video driver that is generally suitable to provide fundamental operations to all video configurations. In the preferred embodiment, the generic video driver is a standard VGA driver. Note that WINDOWS typically places such a generic video driver on the hard drive upon its original installation. Thus, it is highly likely that the generic driver will be available as a default in the absence of the configuration-specific video driver. Step 42, however, determines if the load of the generic driver was successful. The load will be unsuccessful, for example, if the generic driver is also unavailable. In this instance, method 30 continues to step 44 where the method exits WINDOWS and returns to the baseline operating system environment. If the generic video driver is successfully loaded, method 30 continues to step 46 described in greater detail below.

Returning to step 36, if the table includes the proper title, or other driver identifier, then method 30 continues to step 48 where an attempt is made to load the configuration-specific video driver corresponding to the identified title. Particularly, in the preferred embodiment, the intermediate video driver issues inquire and enable commands, along with a pointer, to the configuration-specific video driver. This command causes the driver to load from its stored location, such as on either the system hard drive or a floppy drive. Moreover, the configuration-specific video driver returns its infostructure commencing at the pointer location transmitted by the intermediate video driver.

Continuing to step 50, method 30 ensures that the configuration-specific video driver successfully loaded. For example, if the driver was not located on any storage device, then the attempted load results in a failure. If the load is unsuccessful, method 30 returns to steps 38 and 40 where, as described above, the user is warned and a generic video driver is loaded. Note that the generic video driver is loaded in the same manner as the application specific video driver, that is, the intermediate video driver issues inquire and enable commands, along with a pointer, to the generic video driver. In response, the latter returns its infostructure commencing at the pointer location transmitted by the intermediate video driver.

Returning to step 46, the intermediate video driver copies the resources of the configuration-specific video driver. Particularly, the intermediate video driver initially includes a copy of the largest known set of resources. Thereafter, the intermediate video driver copies the resources of the configuration-specific video driver over the initial set of resources. Because the initial set is sized at a maximum, any actual set can be no larger than the maximum space allocated by beginning with the largest initial set possible. Once copied, the resources are directly accessible via the intermediate video driver to subsystem components such as GDI 14 or window manager 16, or others not shown in FIG. 1.

Before proceeding, note that manipulation of the resources raises an additional consideration. Although believed to be undocumented, under WINDOWS protocol, the first access to the resources after WINDOWS startup sets a flag associated with the kernel. This flag is thereafter interpreted to indicate that the resources not only have been accessed, but also have been pre-processed. Pre-processing typically involves logical operations on the resource data such as AND, OR and XOR. Under the current invention, it was determined that the step of copying the resources from the configuration-specific video driver to the intermediate video driver was causing the above-noted flag to be set. Consequently, the next access of the resources assumed the resources to be pre-processed when, in fact, pre-processing had not yet occurred. In view of the above, another aspect of step 46 involves clearing the kernel resource flag after copying the resources from the configuration-specific video driver to the intermediate video driver. Consequently, only after the next access to the resources will the kernel flag be set, thereby ensuring that the component performing the access does not erroneously interpret the resources as having been pre-processed.

Figure 4A:
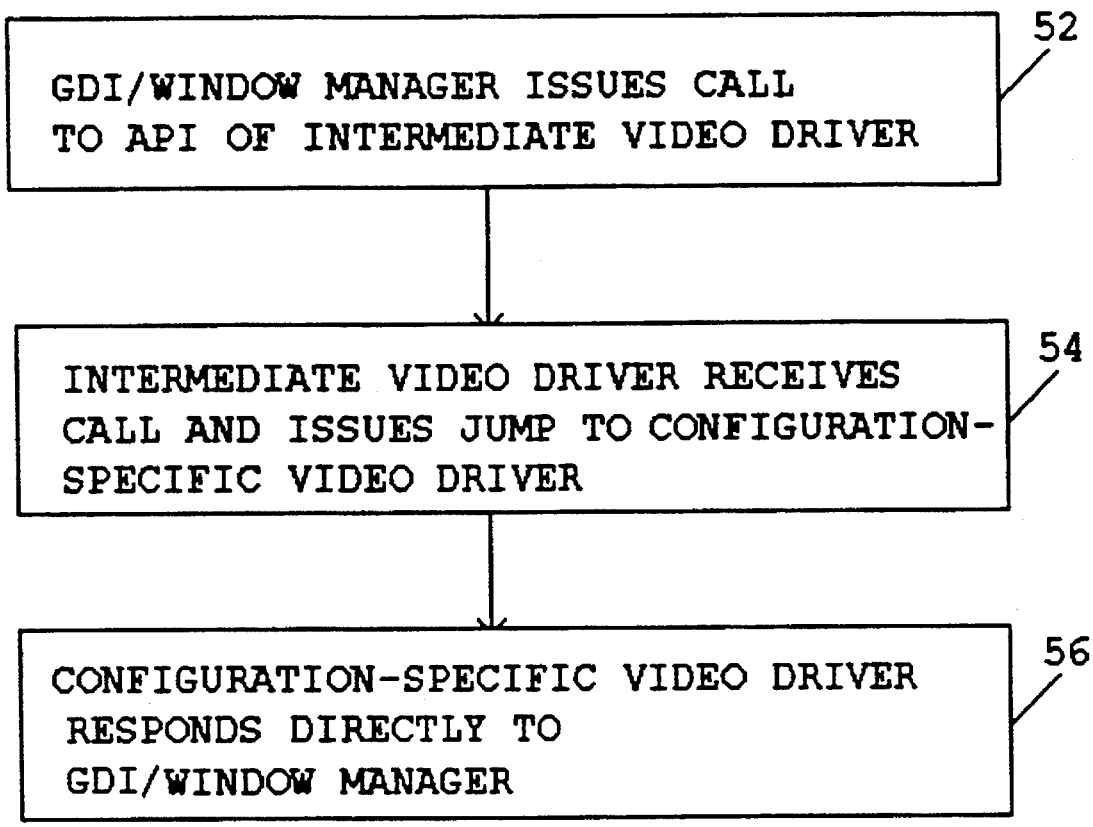
FIG. 4*a* illustrates a flowchart of one embodiment of the inventive method wherein the configuration-specific video driver responds directly to the WINDOWS subsystem component calling it.
Figure 4B:
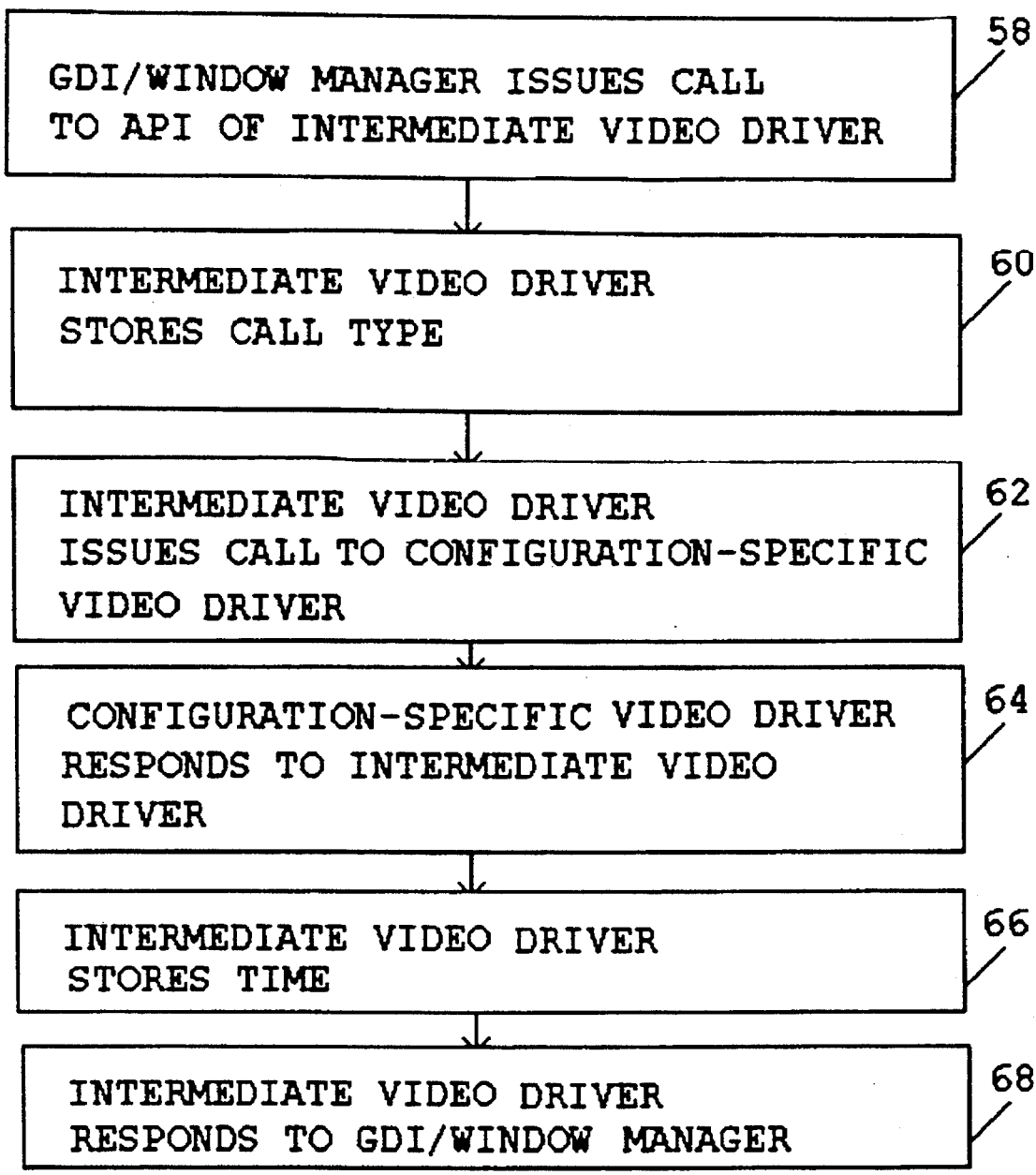
FIG. 4*b* illustrates a flowchart of an alternative embodiment of the inventive method wherein the intermediate video driver accumulates information concerning the protocol activity between the WINDOWS subsystem component and the configuration-specific video driver.

Following step 46, the intermediate video driver is completely initialized and, hence, the configuration-specific driver is installed as well. Thus, returning briefly to FIG. 2, method 30 continues to step 26. As stated above, step 26 establishes communication between the intermediate video driver and the GDI/window manager components. Thereafter, step 28 commences protocol communications between the WINDOWS system and the intermediate video driver. FIGS. 4a and 4b, described below, illustrate alternative methods for such communication in accordance with the present invention.

FIG. 4a illustrates a flowchart of one method of video protocol communication using the intermediate video driver. Starting with step 52, either the GDI or window manager issues a Call to the intermediate video driver. For example, the GDI may call a function to display a square. Typically, the Call identifies the function, and includes any necessary parameters (e.g., size of the square).

In step 54, the intermediate video driver receives the function Call from the GDI. As an intermediary, the intermediate video then reissues the same function Call to the configuration-specific video driver. In the embodiment of FIG. 4a, this control passes by way of a Jump command. Such a command is preferable as it relates to step 56. Particularly, in step 56, the configuration-specific video driver receives the particular function Call by way of the Jump. As known in the art, a Jump passes control directly to a different portion of code and does not require a Return to the point from which the Jump occurred. Thus, the Jump is directly to the API of the configuration-specific video driver. Consequently, this driver performs the appropriate function(s) and the Return is directly to the subsystem component issuing the Call, namely, the GDI (or window manager in a different example). Therefore, note in the FIG. 4a embodiment, the Return bypasses the intermediate video driver. This response also completes the protocol communication and, hence, concludes the particular video function.

FIG. 4b illustrates a flowchart of a second and alternative method of video protocol communication using the intermediate video driver. Briefly, the key difference between FIGS. 4a and 4b is that the communications of FIG. 4b, both to and from the configuration-specific video driver, are through the intermediate video driver. Further, data is recorded creating an analytical method for profiling the video protocol communications.

Starting with step 58, as in step 52 of FIG. 4a, either the GDI or window manager issues a Call to the intermediate video driver. In step 60, the intermediate video driver receives the Call. Before passing control, however, the intermediate video driver stores the type of function called in a table or the like. Moreover, in the preferred embodiment, this storage process may continue over a user-definable period of time. As a result, the table will catalogue the types of subsequent Calls made over the specified period of time. This catalogue is a very helpful analytical tool. For example, for a given word processor using WINDOWS, the catalogue provides a listing over time of which functions are used and the corresponding frequency of use. From this information, efficiency calculations can be made, debugging is facilitated, and analyses may be focused on improving more frequently used commands.

In step 62, the intermediate video driver passes control to the configuration-specific video driver. In contrast to the method of FIG. 4a, the method of FIG. 4b passes control by issuing its own Call command (along with the desired function) rather than a Jump command.

In step 64, the configuration-specific video driver receives the Call command from the intermediate video driver. The former then executes the command, but responds by issuing its Return back to the intermediate video driver. Consequently, the intermediate video driver can identify the amount of time which passed between its own issuance of a Call and the Return from the configuration-specific video driver. In step 66, this time period is also stored in a table and used for purposes like those described above.

Lastly, in step 68, the intermediate video driver responds to the original subsystem component which issued the command Call (e.g., GDI). This response completes the protocol communication and, hence, concludes the particular video function.

In view of the above, it should be appreciated that the present invention provides a method for automatically selecting an appropriate video system driver based on the current video system configuration. Numerous other aspects are illustrated, all of which illustrate that while the present invention has been described in detail, various substitutions, modifications and alterations could be made to it without departing from its intended scope. For example, while current technology only is able to ascertain certain controller types, advanced methodology may be derived which permits determination of additional types of controllers. As another example, methodologies of determining detailed configuration information about the particular video device may also be incorporated to further refine the choice of a specific video driver, and possibly to configure that driver in accordance with the additional level of detail. As yet another example, the components of WINDOWS are typically implemented in software, as are the preferred methodologies of the present invention. This software runs by various different processors typically implemented in IBM-PC compatible computers. Nonetheless, a combination of hardware with software may be found as a suitable alternative for certain or all of the steps described herein. As still another example, the present invention may have application in environments or operating systems other than WINDOWS. As a final example, while the invention has been exemplified in certain aspects using known programming terms such as "Call," "Jump" and "Return," it should be understood, that the function as known of those terms is implicated and could be accomplished using alternative instructions to accomplish the same or similar processes. In any event, each of these examples, as well as the description set forth above, demonstrates that the mode described herein is by way of example and should not limit the scope of the invention as defined by the following claims.

What is claimed is:

1. A method of driving a video device having a configuration of a predetermined type, comprising the steps of:

loading an intermediate video driver;

electronically determining said type of said configuration;

loading a configuration-specific video driver corresponding to said predetermined type of configuration; and following said loading steps, further comprising the steps of:

first, communicating a first video protocol from a system to said intermediate video driver, wherein said first video protocol comprises a function request, wherein each of said intermediate video driver and said configuration-specific video driver are operable to respond directly to said function request; and second, communicating a second video protocol from said intermediate video driver to said configuration-specific video driver in response to said first communicating step, wherein said second video protocol includes said function request of said first video protocol and is directed to said configuration-specific video driver such that said configuration-specific video driver performs a function corresponding to said function request.

2. The method of claim 1 wherein said step of electronically determining said type of said configuration comprises polling a register associated with said configuration, wherein said register contains data identifying said type of said configuration.

3. The method of claim 1 wherein said step of loading an intermediate video driver comprises the steps of:

providing an initial set of resources having a first predetermined size; and copying a secondary set of resources having a second predetermined size from said configuration-specific video driver over said initial set of resources, wherein said second predetermined size is less than or equal to said first predetermined size.

4. The method of claim 3 wherein said configuration-specific video driver is loaded at least in part by a kernel having a flag indicating pre-processing of said secondary resources, and further comprising the step of clearing said flag after said copying step.

5. The method of claim 1 wherein said step of communicating a second video protocol to said configuration-specific video driver comprises jumping to said configuration-specific video driver, and further comprising the step of returning from said configuration-specific video driver to said system.

6. The method of claim 1 and further comprising the step of, after said first communicating step and before said second communicating step, storing said first video protocol in a table.

7. The method of claim 1 wherein said step of communicating a second video protocol to said configuration-specific video driver comprises calling said configuration-specific video driver such that return from said configuration-specific video driver is to said intermediate video driver.

8. The method of claim 7 and further comprising the steps of:

receiving by said intermediate video driver a return from said configuration-specific video driver following said step of communicating a second video protocol from said intermediate video driver to said configuration-specific video driver; and storing the time elapsed between said step of communicating said second video protocol and said step of receiving said return.

9. A method of driving a video device having a configuration of a predetermined type, comprising the steps of:

loading an intermediate video driver;

electronically determining said type of said configuration;

loading a configuration-specific video driver corresponding to said predetermined type of configuration; and following said loading steps, further comprising the steps of:

first, communicating a request to perform a function from a system to said intermediate video driver, wherein said system perceives said intermediate video driver as said configuration-specific video driver and said configuration-specific video driver is operable to respond directly to said request to perform a function; and second, communicating a video protocol from said intermediate video driver to said configuration-specific video driver in response to said first communicating step and;

third, performing said function by said configuration-specific video driver.

10. The method of claim 9 wherein said step of loading a configuration-specific video driver comprises:

issuing a command from said intermediate video driver to said configuration-specific video driver, wherein said command comprises a pointer; and returning from said configuration-specific video driver an infostructure to a location indicated by said pointer.

11. The method of claim 10 wherein said pointer comprises a first pointer, and wherein said step of loading an intermediate video driver comprises:

issuing a command from said system to said intermediate video driver, wherein said command comprises a second pointer; and returning from said intermediate video driver an infostructure to a location indicated by said pointer, wherein said infostructure returned from said intermediate video driver is the same as said infostructure returned from said configuration-specific video driver.

12. The method of claim 10 wherein said intermediate video driver comprises an initial set of resources having a first predetermined size, and wherein said step of loading an intermediate video driver comprises copying a secondary set of resources having a second predetermined size from said configuration-specific video driver over said initial set of resources, wherein said second predetermined size is less than or equal to said first predetermined size.

13. The method of claim 9 wherein said step of loading a configuration-specific video driver comprises:

issuing a command from said intermediate video driver to said configuration-specific video driver, wherein said command comprises a first pointer; and returning from said configuration-specific video driver an infostructure to a location indicated by said first pointer;

wherein said step of loading an intermediate video driver comprises:

issuing a command from said system to said intermediate video driver, wherein said command comprises a second pointer;

returning from said intermediate video driver an infostructure to a location indicated by said pointer, wherein said infostructure returned from said intermediate video driver is the same as said infostructure returned from said configuration-specific video driver; and wherein said intermediate video driver comprises an initial set of resources having a first predetermined size, and wherein said step of loading an intermediate video driver comprises copying a secondary set of resources having a second predetermined size from said configuration-specific video driver over said initial set of resources, wherein said second predetermined size is less than or equal to said first predetermined size.

14. A method of driving a video device having a configuration of a predetermined type, comprising the steps of:

electronically determining said type of said configuration;

loading an intermediate video driver;

loading a configuration-specific video driver corresponding to said predetermined type of configuration;

following said loading steps, further comprising the steps of:

communicating a first video protocol from a system to said intermediate video driver, wherein said first video protocol comprises a function request, wherein each of said intermediate video driver and said configuration-specific video driver are operable to respond directly to said function request;

communicating a second video protocol from said intermediate video driver to said configuration-specific video driver in response to said first communicating step, wherein said second video protocol includes said function request of said first video protocol and is directed to said configuration-specific video driver such that said configuration-specific video driver performs a function corresponding to said function request; and wherein said first and second video protocol is communicated in a WINDOWS environment.

15. The method of claim 14 wherein said step of communicating a second video protocol to said configuration-specific video driver comprises jumping to said configuration-specific video driver, and further comprising the step of returning from said configuration-specific video driver to said system.

16. The method of claim 14 wherein said step of communicating a second video protocol to said configuration-specific video driver comprises calling said configuration-specific video driver.

17. The method of claim 16 and further comprising the steps of:

storing said first video protocol in a table;

receiving a return from said configuration-specific video driver following said step of communicating a second video protocol from said intermediate video driver to said configuration-specific video driver; and storing the time elapsed between said step of communicating said second video protocol and said step of receiving said return.

18. The method of claim 14 and further comprising the steps of:

providing an initial set of resources having a first predetermined size; and copying a secondary set of resources having a second predetermined size from said configuration-specific video driver over said initial set of resources, wherein said second predetermined size is less than or equal to said first predetermined size.

* * * * *